US008645302B2

(12) United States Patent
Chen et al.

(10) Patent No.: US 8,645,302 B2
(45) Date of Patent: Feb. 4, 2014

(54) DYNAMIC CONSTRAINT SATISFACTION PROBLEM SOLVER WITH PART-WHOLE HIERARCHY CONSTRAINTS

(75) Inventors: Gao Chen, Beijing (CN); Claire M. Bagley, Carlisle, MA (US); Martin P. Plotkin, Concord, MA (US)

(73) Assignee: Oracle International Corporation, Redwood Shores, CA (US)

( * ) Notice: Subject to any disclaimer, the term of this patent is extended or adjusted under 35 U.S.C. 154(b) by 611 days.

(21) Appl. No.: 12/431,086

(22) Filed: Apr. 28, 2009

(65) Prior Publication Data
US 2010/0274748 A1     Oct. 28, 2010

(51) Int. Cl.
*G06F 17/00*     (2006.01)
*G06N 5/02*     (2006.01)

(52) U.S. Cl.
USPC .......................................................... 706/47

(58) Field of Classification Search
None
See application file for complete search history.

(56) References Cited

U.S. PATENT DOCUMENTS

| | | | | |
|---|---|---|---|---|
| 6,223,170 | B1 * | 4/2001 | Skovgaard | 706/47 |
| 6,405,308 | B1 * | 6/2002 | Gupta et al. | 713/1 |
| 7,043,407 | B2 * | 5/2006 | Lynch et al. | 703/1 |
| 7,069,537 | B2 | 6/2006 | Lazarov | |
| 7,333,968 | B2 | 2/2008 | Geller et al. | |
| 2002/0107749 | A1 | 8/2002 | Leslie et al. | |
| 2002/0143653 | A1 | 10/2002 | DiLena et al. | |
| 2002/0166089 | A1 | 11/2002 | Noy | |
| 2004/0019852 | A1 | 1/2004 | Purvis | |
| 2005/0198621 | A1 | 9/2005 | Tillmann et al. | |
| 2005/0278271 | A1 | 12/2005 | Anthony et al. | |
| 2007/0094184 | A1 | 4/2007 | Emek et al. | |
| 2010/0125607 | A1 * | 5/2010 | Axling | 707/791 |

FOREIGN PATENT DOCUMENTS

| | | | | | |
|---|---|---|---|---|---|
| FR | EP0916262 | A1 * | 1/1999 | | G10H 1/00 |
| FR | EP0961262 | A1 * | 1/1999 | | G10H 1/00 |

OTHER PUBLICATIONS

Ryu, Y.U.; , "A hierarchical constraint satisfaction approach to product selection for electronic shopping support," Systems, Man and Cybernetics, Part A: Systems and Humans, IEEE Transactions on , vol. 29, No. 6, pp. 525-532, Nov. 1999.*

Motschnig-Pitrik, R.; Kaasboll, J.; , "Part-whole relationship categories and their application in object-oriented analysis," Knowledge and Data Engineering, IEEE Transactions on , vol. 11, No. 5, pp. 779-797, Sep./Oct. 1999.*

Oracle Configurator, Modeling Guide Release 12, Dec. 2006, Part No. B28683-02.*

Oracle Configurator, Modeling Guide Release 11i, Jun. 2003, Part No. B10943-01.*

Frühwirth, Thom et al., "Principles of Constraint Systems and Constraint Solvers", Archives of Control Sciences: Special Issue on Constraint Programming, 16(2) http://www.informatik.uni-ulm.de/pm/mitarbeiter/fruehwirth/Papers/acs-systems3.pdf, 2006.

Lhomme, Olivier, "Consistency Techniques for Numeric CSPs", Proceedings in IJCAI-93 pp. 232-238, 1993 Chambery, France.

(Continued)

*Primary Examiner* — Kakali Chaki
*Assistant Examiner* — Daniel Pellett
(74) *Attorney, Agent, or Firm* — Miles & Stockbridge P.C.

(57) ABSTRACT

A constraint solver for solving a constraint satisfaction problem model which includes at least one part-whole hierarchy assigns variables to each part of the part-whole hierarchy. The variables include at least one of selected, quantity, and relative quantity, wherein each part has a parent. The solver automatically applies at least one part-whole hierarchy constraint to the part and solves the model and generates a solution.

17 Claims, 8 Drawing Sheets

(56) References Cited

OTHER PUBLICATIONS

Selectica, "Selectica Configuration", Solution Overview, 2005, Selectica, Inc., San Jose, CA.
Ilog, "ILOG: Configurator, Powering online product and service configuration applications", Product Datasheet, Mar. 2005, ILOG.S.A.
Oracle, "Oracle Configurator", Oracle Data Sheet, 2008, Oracle.
Benhamou, Frédérick et al., "Applying Interval Arithmetic to Real, Integer and Boolean Constraints", Journal of Logic Programming, 32(1), 1997.
Sabin, Daniel et al., "Configuration as Composite Constraint Satisfaction", Proceedings of the (1st) Artificial Intelligence and Manufacturing Research Planning Workshop, 1996.
Ulrich Junker et al., "Preference programming: Advanced problem solving for configuration", pp. 13-29, 2002.
Narendra Jussien et al., "Dynamic domain splitting for numeric CSPS", pp. 225-227, 1998.
Fleischanderl, Gerhard et al., "Configuring Large Systems Using Generative Constraint Satisfaction", IEEE, pp. 59-68, No. 1094-7167/98, Jul./Aug. 2008, IEEE.
Muttal, Sanjay et al., "Dynamic Constraint Satisfaction Problems", Proceedings of the Eighth National Conference on Artificial Intelligence, 1996.
Stumptner, Markus et al., "Generative Constraint-Based Configuration of Large Systems", Artifical Intelligence for Engineering Design, analysis and Manufacturing, pp. 307-320, No. 12, 1998, Cambridge University Press, USA.
Gelle, Esther et al., "Solving Methods for Conditional Constraint Satisfaction", IJCAL, 2003.

\* cited by examiner

| Computer | Memory Slot | Memory Card |
|---|---|---|
| Selected: false/true<br>Qty: ≥0<br>RelQty: ≥0 | Selected: false/true<br>Qty: ≥0<br>RelQty: ≥1 | Selected: false/true<br>Qty: ≥0<br>RelQty: 0-1 |

DYNAMIC CONSTRAINT SATISFACTION PROBLEM SOLVER WITH PART-WHOLE HIERARCHY CONSTRAINTS

FIELD OF THE INVENTION

One embodiment is directed generally to a computer system, and in particular to a constraint based computer system that solves dynamic constraint satisfaction problems.

BACKGROUND INFORMATION

Many of the tasks that are addressed by decision-making systems and artificial intelligence systems can be represented as constraint satisfaction problems ("CSP"s). In this representation, the task is specified in terms of a set of variables, each of which can assume values in a given domain, and a set of constraints that the variables must simultaneously satisfy. The set of variables, domains and constraints is referred to as a CSP. Each constraint may be expressed as a relation, defined over some subset of the variables, denoting valid combinations of their values. A solution to a CSP is an assignment of a value to all the variables from their respective domains that satisfies all of the constraints.

A constraint based system includes a constraint solver that attempts to find one or more solutions to a given CSP, or prove that no solution exists. Constraint based systems are used for many artificial intelligence related applications and a variety of other applications, including: (1) Product configurators; (2) Robotic control; (3) Temporal reasoning; (4) Natural language processing; (5) Spatial reasoning; (6) Test-case generation for software and hardware systems; (7) Machine vision; (8) Medical diagnosis; (9) Resource allocation; and (10) Frequency allocation.

The network of constraints in a CSP can be viewed as a graph, having a node for each variable and "arc" for each constraint. The members of each arc are the variables that appear in the constraint to which the arc corresponds. An arc is said to be consistent if for any variable of the arc, and any value in the domain of the variable, there is a valid assignment of values to the other variables on the arc that satisfies the constraint represented by the arc.

Classes of problems exist which are comprised of very large sets of variables that may only be conditionally related or required for a solution. One example of such problems is the configuration of large component-based systems. For example, selecting a type of hard disk controller for a computer configuration is not needed if a hard disk has not been chosen as a form of storage. If instead flash memory is chosen, a different set of variables and constraints would be required to be solved. Known CSP solvers do not allow the representation of conditional structure or reasoning over an inclusion of a variable in a solution. Techniques have been developed to allow such large problems to be represented as a set of smaller sub-problems, conditionally related through composition or association. A "dynamic constraint satisfaction problem" is one in which these sub-problems of variables and constraints can be incrementally added as required, either explicitly or as a result of inference from the propagation of constraints.

One known approach to minimize large CSP problems is referred to as "Conditional CSP", and includes the notion of a variable being active or inactive, as well as constraints to activate a variable. In this approach, a variable is only assigned a value in the final solution if it is active. Conditional CSP is limited in that it does not provide any significant space savings in large problems, nor does it allow for segmentation of related variables into sub-problems. Another known approach is referred to as "Generative CSP" and extends Conditional CSP by introducing the concept of components, which are groups of related variables, and component type, which is the further extension and specialization of these components. However, similar to Conditional CSP, Generative CSP is still implemented in terms of activity state and does not provide real space savings.

SUMMARY OF THE INVENTION

One embodiment is a constraint solver for solving a constraint satisfaction problem model which includes at least one part-whole hierarchy. The solver assigns variables to each part of the part-whole hierarchy. The variables include at least one of selected, quantity, and relative quantity, wherein each part has a parent. The solver automatically applies at least one part-whole hierarchy constraint to the part and solves the model and generates a solution.

BRIEF DESCRIPTION OF THE DRAWINGS

FIG. 2 illustrates the characteristics of each part of an Example 1 in accordance with one embodiment.

DETAILED DESCRIPTION

One embodiment is a dynamic constraint satisfaction problem solver that implements various constraints in a model that includes a part-whole hierarchy. These constraints optimize the performance of the solver and minimize the solution size.

Figure 1:
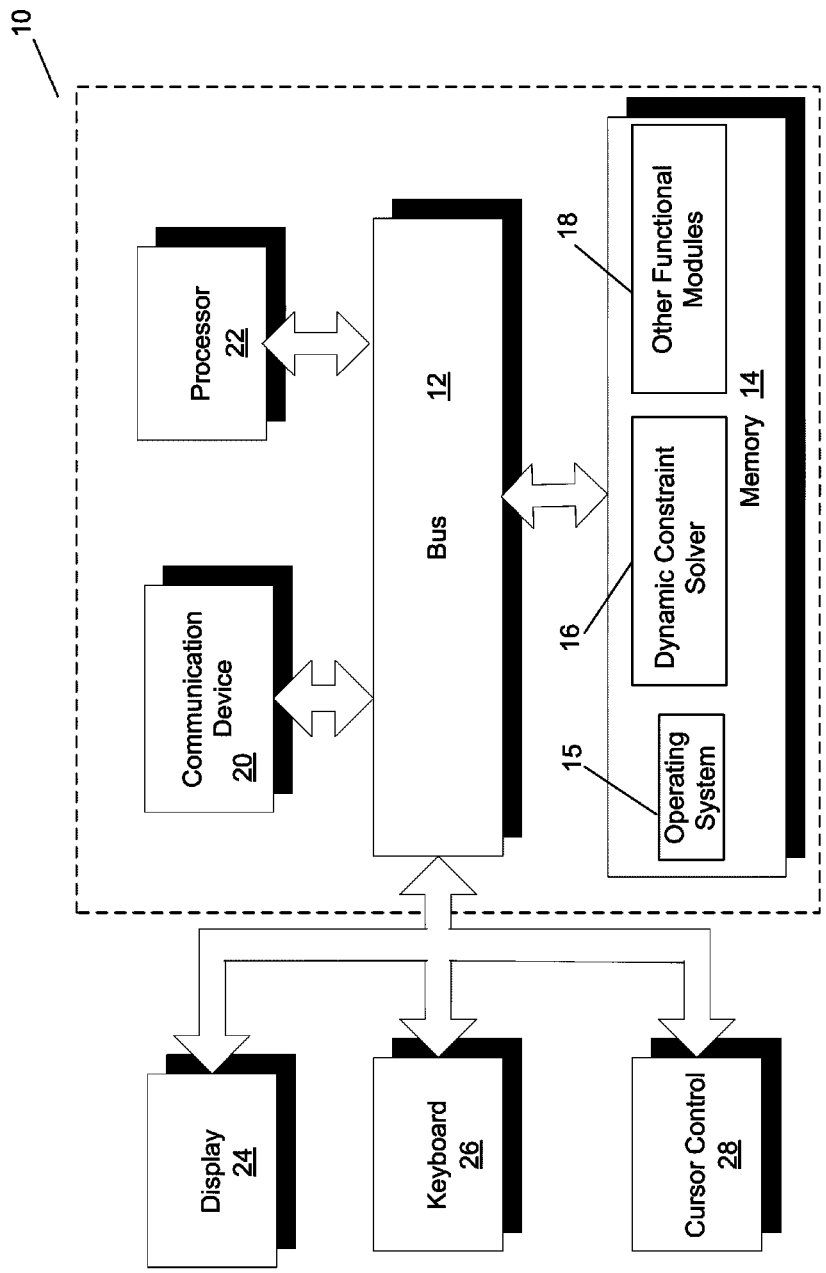
FIG. 1 is a block diagram of a dynamic constraint based system that can implement an embodiment of the present invention.

FIG. 1 is a block diagram of a dynamic constraint based system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a dynamic constraint solver module 16 that performs dynamic constraint solving with constraints for a part-whole hierarchy as disclosed in more detail below. System 10 can be part of a larger system that includes a constraint solver, such as a product configurator or artificial intelligence system. Therefore, system 10 will typically include one or more additional functional modules 18 to include the additional functionality.

System 10 in one embodiment solves constraint satisfaction problems ("CSP"s). Some CSPs are naturally structured (i.e., the variables naturally cluster into sub-problems, where each sub-problem participates in the solution as a unit). In such problems, the solution process for a sub-problem can be broken into two phases: first, a determination as to whether the sub-problem participates in the solution, and second, if it participates, a determination of the values of the variables in the sub-problem. Known dynamic CSP solvers disclosed above (i.e., Conditional CSP and Generative CSP solvers) can exploit such problem structuring.

One known class of structured problems is the "part-whole hierarchy". In such problems, the structure is composed of a set of parts which themselves can have other parts (e.g., components and sub-components). For example, manufactured or assembled products are often modeled as part-whole hierarchies. Such products may be configurable in the sense that different instances of the product may consist of different subsets of the possible parts, and characteristics of the parts may differ. Representing such a configurable product as a CSP permits the application of constraint solving techniques to the configuration process. The parts/components of a part-whole hierarchy can be represented as the sub-problems of a dynamic CSP when modeling a problem in order to optimize performance of the solver and reduce the solution space.

A part-whole hierarchy may be characterized by the quantity (or count) of the part/component, with the quantity being implicitly relative to the parent. The quantity of the part may be as follows The quantity can be 1, meaning that the part is mandatory for the parent;

The quantity can be 0, meaning that the part is optional for the parent; or

The quantity can be value greater than 1, meaning that multiple instances of the part can exist within the parent. For this quantity, it may be further specified whether all of the instances must be configured identically (i.e., must all have the same parts and values for all variables), or may be configured differently (i.e., some of the instances may have different parts or values for some variables).

A part in a dynamic CSP model in one embodiment is a sub-problem encapsulating its own properties and relationships. Each part may have three characteristics that determine its presence and quantity within the hierarchy. Each characteristic is represented as a variable in the sub-problem representing the part, and values are assigned to these variables in the solution process. The characteristics in one embodiment include:

"Selected": defined as a Boolean variable, which represents whether or not a part is included in the solution;

"Quantity": defined as a numeric variable, which represents the total number of instances of a part in the solution, summed across all instances of its parent; and "Relative Quantity": defined as a numeric variable, which represents how many instances of this part are present per unit quantity of the parent.

Example 1 below is an example of a part-whole hierarchy for a configurator that is modeling a computer system that includes a memory slot for memory cards:

---

Example 1

Computer
|_Memory Slot
   |_Memory Card

---

In the part-whole hierarchy of Example 1, each computer may have one or more memory slots, and each memory slot may have zero or one memory card plugged in, meaning that the memory card is optional. Each computer, memory slot, and memory card has three characteristics: Selected, Quantity, and Relative Quantity. FIG. 2 illustrates the characteristics of each part of Example 1 in accordance with one embodiment.

In one embodiment, to represent the structure in a way that permits efficient reasoning and searching of the problem space, solver 16 supports classifying parts as static or dynamic based on input from a modeler. A static part is automatically generated as a mandatory sub-component for ease of user interaction. Once the parent part is generated, its static child parts are also generated as a part of the structure, and the user can interface with the child parts immediately. A static part may have a quantity of 0 if it is actually not required.

Figure 3:
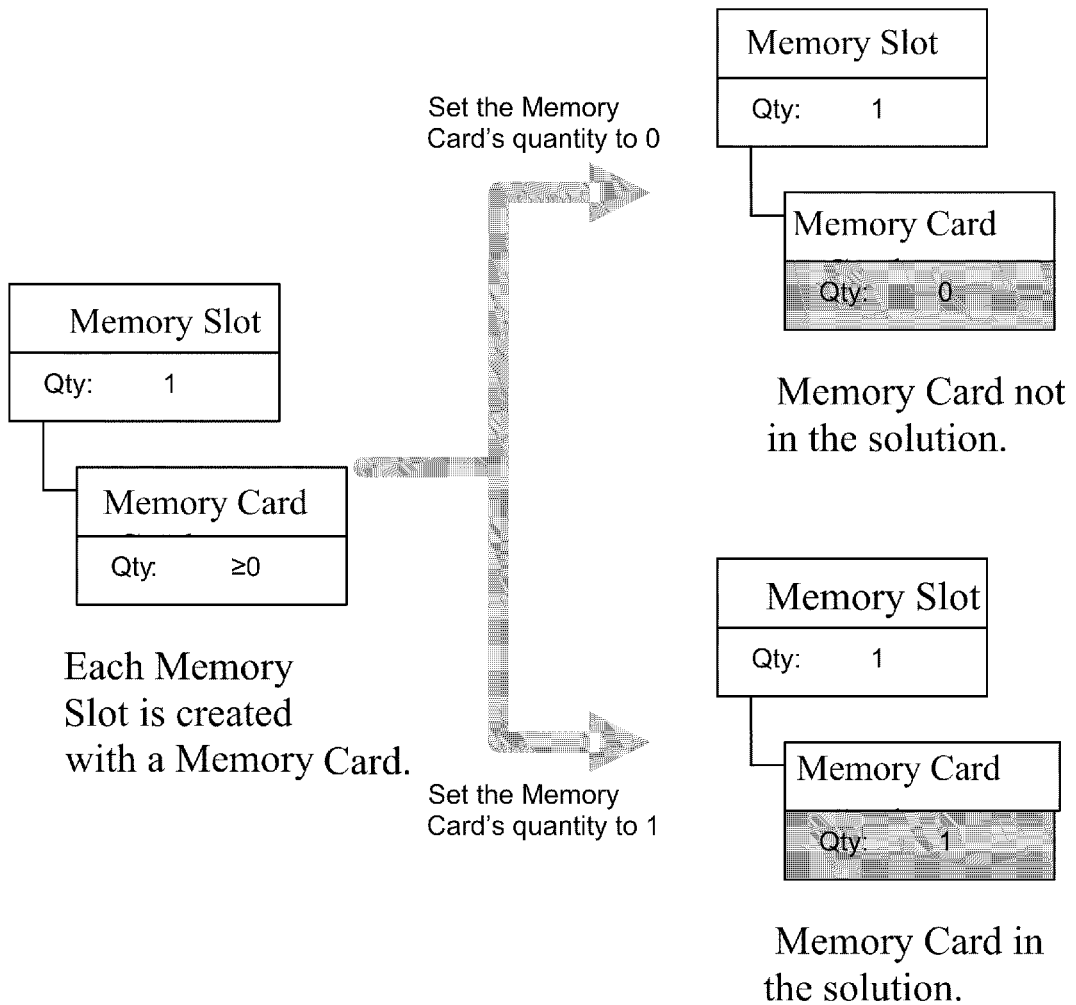
FIG. 3 is a block diagram illustrating the automatic creation of a memory card if it is a static part and if its quantity is set to 0 or 1 in accordance with one embodiment.

For example, in Example 1 above, if the memory card is classified as a static part, each time that a user creates a memory slot a memory card will also be automatically created under it. The user can set the quantity of the memory card to 0 to indicate that the user does not actually want it in the solution. FIG. 3 is a block diagram illustrating the automatic creation of a memory card if it is a static part and if its quantity is set to 0 or 1 in accordance with one embodiment.

For a very large structure, it may not be efficient to generate all possible parts from the very beginning if in the end the user may only care about a small portion of it. Therefore, one embodiment supports classifying some parts as dynamic parts. Dynamic parts are optional sub-components. In one embodiment, dynamic parts are only generated when explicitly requested by the user or required by the system. It is possible that multiple instances of the same dynamic part may be needed if the user requires multiple instances of the part with different settings. Once generated, a dynamic part is automatically selected since it is required either by the user or by the system.

Figure 4:
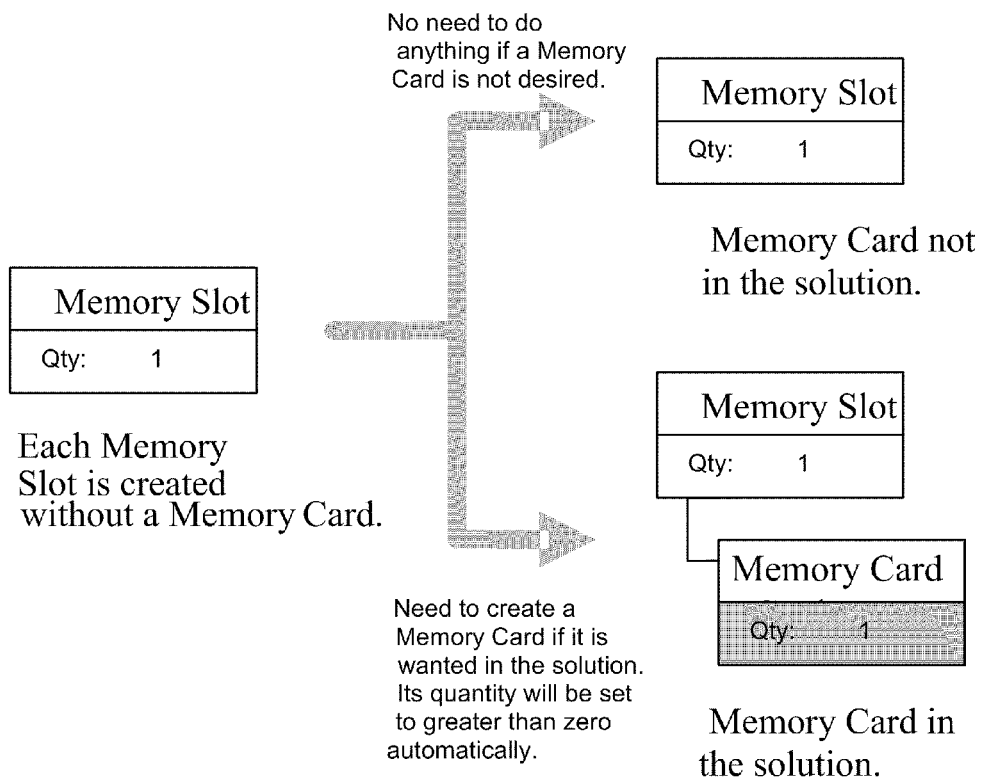
FIG. 4 illustrates the creation of a memory slot if the memory card is a dynamic part in accordance with one embodiment.
Figure 6:
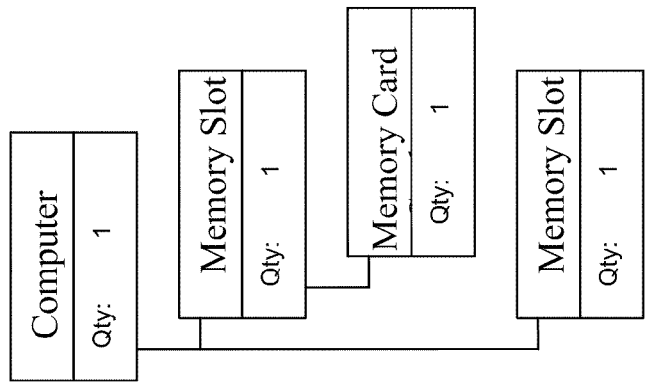
FIG. 6 illustrates a computer with two memory slots configured differently with one memory slot having a memory card and one memory slot having no memory card in accordance with one embodiment.
Figure 5:
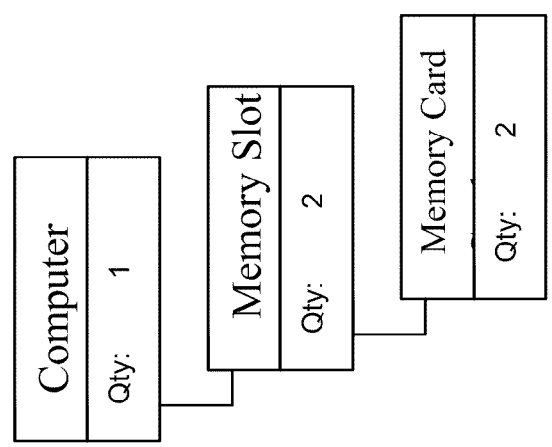
FIG. 5 illustrates a computer with two memory slots configured identically with each memory slot having a memory card in accordance with one embodiment.

For example, in Example 1 above, if the memory card is classified as a dynamic part rather than a static part, when the user creates a memory slot there will be no memory card created under it. If the user wants a memory card in the solution, the user has to manually create it or it could be created due to enforcement of a constraint on its quantity. Unlike a static part, each memory card has its quantity greater than 0 to ensure that it is in the solution. Setting its quantity to 0 will trigger a conflict. Classifying the memory card as a dynamic part is more efficient than classifying it as a static part if the user typically does not need a memory card in the solution. FIG. 4 illustrates the creation of a memory slot if the memory card is a dynamic part in accordance with one embodiment. FIG. 5 illustrates a computer with two memory slots configured identically with each memory slot having a memory card in accordance with one embodiment. FIG. 6 illustrates a computer with two memory slots configured differently with one memory slot having a memory card and one memory slot having no memory card in accordance with one embodiment.

In one embodiment, solver 16 automatically implements a variety of variables and constraints for part-whole hierarchies. These variables and constraints do not have to be implemented by a modeler and result in an optimization of performance and a smaller solution space.

The first constraint causes a part to be selected if and only if its quantity is greater than zero. To satisfy this requirement, the sub-problem representing each part includes the following constraint in one embodiment: Selected=(Quantity>0). If the part is dynamic, this constraint can be optimized by excluding "0" from the domain of Relative Quantity, and excluding "false" from the domain of Selected. This is because a dynamic part is always selected when it exists in one embodiment.

Figure 7:
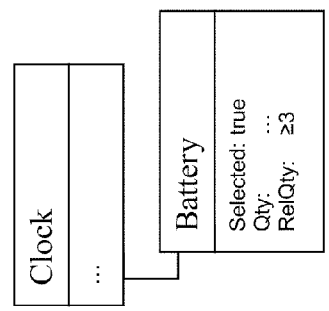
FIG. 7 illustrates a clock that must have at least 3 batteries.

Another constraint causes each part to have a minimum quantity value that is defined so that when the part is selected, its relative quantity must be no less than this value. If the part is a dynamic part and multiple instances are allowed, the restriction on the relative quantity applies to the sum of relative quantities on all instances, rather than to the relative quantity of each instance. For example, for a certain kind of clock, if it comes with batteries, each clock must have at least 3 batteries. To satisfy the above requirement, the sub-problem representing each part includes the following constraint: Selected implies (Relative Quantity>=Minimum Quantity). If the part is a dynamic part, the following constraint is created on all instances representing the part under the same parent: (Sum of Relative Quantity on all instances>0) implies (Sum of Relative Quantity on all instances>=Minimum Quantity). FIG. 7 illustrates a clock that must have at least 3 batteries.

Figure 8:
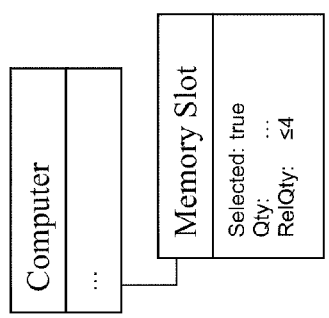
FIG. 8 illustrates an example of a computer part that cannot have more than 4 memory slots.

Another constraint causes each part to have a maximum quantity value so that when the part is selected, its relative quantity must be no greater than this value. If the part is a dynamic part and multiple instances are allowed, the restriction on the relative quantity applies to the sum of relative quantities on all instances, rather than to the relative quantity of each instance. To satisfy this requirement, the sub-problem representing each part includes the following constraint: Relative Quantity<=Maximum Quantity. If the part is a dynamic part, the following constraint is created on all instances representing the part under the same parent: Sum of Relative Quantity on all instances<=Maximum Quantity. FIG. 8 illustrates an example of a computer part that cannot have more than 4 memory slots.

Figure 9:
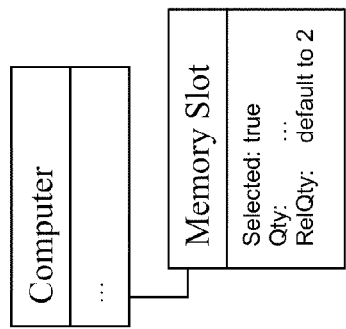
FIG. 9 illustrates a computer part that includes 2 memory slots by default.

Another constraint causes each part to have a default quantity value so that when it is selected and the user does not specify a quantity, its relative quantity will be set to this value. If the part is a dynamic part and multiple instances are allowed, the default quantity applies to the sum of relative quantities on all instances, rather than to the relative quantity of each instance. To satisfy this requirement, the sub-problem representing each part includes the following soft constraint: Selected implies (Relative Quantity=Default Quantity). A "soft constraint" is a constraint that is not mandatory and can represent a preference on the part of a modeler when, for example, selecting defaults. If the part is a dynamic part, the following soft constraint is created on all instances representing the part under the same parent: (Sum of Relative Quantity on all instances>0) implies (Sum of Relative Quantity on all instances=Default Quantity). FIG. 9 illustrates a computer part that includes 2 memory slots by default.

Figure 10:
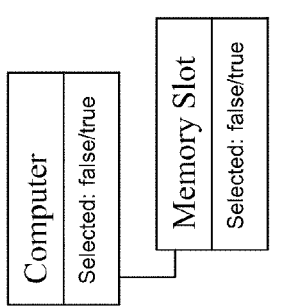
FIG. 10 illustrates an example where the memory slot's quantity equals the computer's quantity times the memory slot's relative quantity in accordance with one embodiment.
Figure 10:
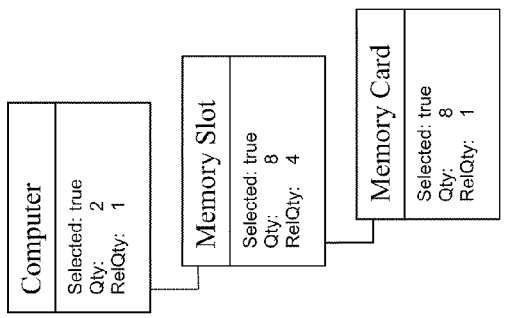

A further constraint causes the quantity of a part to always equal the quantity of its parent part multiplied by its relative quantity. Additionally, a part cannot be selected unless its parent part is also selected. To satisfy these requirements, the sub-problem representing the parent part includes the following constraint for each child part: Child Part's Quantity=(Parent Part's Quantity*Child Part's Relative Quantity). FIG. 10 illustrates an example where the memory slot's quantity equals the computer's quantity times the memory slot's relative quantity in accordance with one embodiment.

Figure 11:
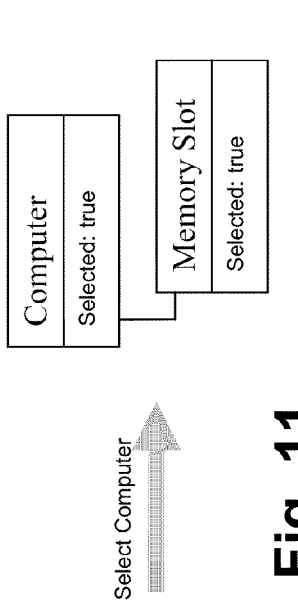
FIG. 11 illustrates an example of a memory slot being a required static part of a computer in accordance with one embodiment.
Figure 12:
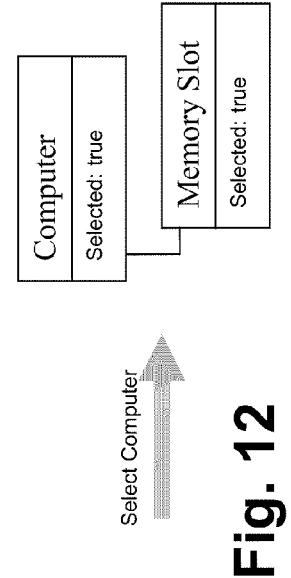
FIG. 12 illustrates an example of a memory slot being a required dynamic part of a computer in accordance with one embodiment.

A further constraint causes a part to be either "required" or "optional" for its parent. A required part must be selected if the parent is selected. To enforce this requirement, the sub-problem representing each part includes the following constraint: Parent part's selected implies required part's Selected. If the part is a dynamic part, the following constraint is created: Parent part's Selected implies at least one required part is created (which will be selected automatically since it is a Dynamic Part). FIG. 11 illustrates an example of a memory slot being a required static part of a computer in accordance with one embodiment. In the example of FIG. 11, selecting a computer will also select the memory slot. FIG. 12 illustrates an example of a memory slot being a required dynamic part of a computer in accordance with one embodiment. In the example of FIG. 12, selecting a computer will also create a memory slot and select it.

Figure 13:
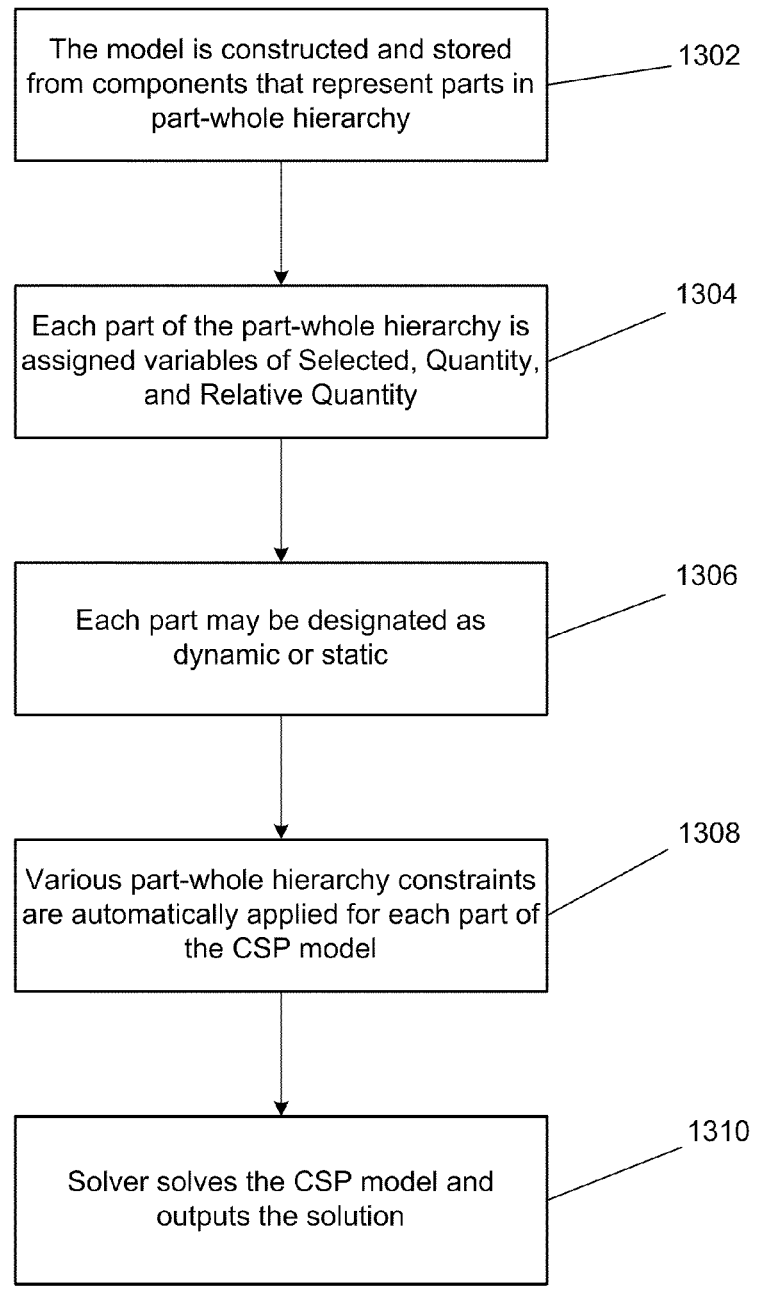
FIG. 13 is a flow diagram of the functionality of a dynamic constraint solver module when implementing a part-whole hierarchy for a CSP in accordance with one embodiment.

FIG. 13 is a flow diagram of the functionality of dynamic constraint solver module 16 when implementing a part-whole hierarchy for a CSP in accordance with one embodiment. In one embodiment, the functionality of the flow diagram of FIG. 13 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1302, a modeler has determined that a dynamic CSP should be modeled as a part-whole hierarchy. As a result, the model is constructed from components that represent parts in a part-whole hierarchy and stored by solver 16.

At 1304, each part of the part-whole hierarchy is assigned three variables: Selected, Quantity, and Relative Quantity. In other embodiments, less than all of these variables may be used.

At 1306, each part may be designated as dynamic or static.

At 1308, one or more of the part-whole hierarchy constraints disclosed above are automatically applied to each part.

At 1310, solver 16 solves the CSP model and outputs the solution. The solution may be output, for example, on display 24 of FIG. 1.

As disclosed, the solver in accordance to one embodiment assigns variables representing the presence and quantity of each part in a part-whole hierarchy of a CSP model. Various constraints are implemented for the parts to allow the solver to solve the model efficiently.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to function as a constraint solver for solving a constraint satisfaction problem (CSP) model, wherein the model comprises a least one part-whole hierarchy, the solving comprising:
   for at least one part of the part-whole hierarchy, assigning variables comprising selected, quantity, and relative quantity;
   automatically applying at least one part-whole hierarchy constraint to the part when a parent for the part is selected, wherein the constraint is based on the selected variable, quantity variable and relative quantity variable assigned to the part; and
   solving the model and generating a solution;
   wherein the selected variable represents whether the part is included in the solution for the CSP, the quantity variable represents a total number of instances of the part in the solution summed across all instances of the parent in the CSP, and the relative quantity variable represents a number of instances of the part per unit quantity of the parent in the CSP;
   wherein the part is a sub-problem of the solution for the CSP and comprises variables and constraints;
   wherein an automatically applied part-whole hierarchy constraint comprises a quantity of the part is equal to a quantity of its parent multiplied by its relative quantity variable, and solving the model comprises dynamically generating additional instances of the part to equal the quantity of its parent multiplied by its relative quantity variable.

2. The computer readable medium of claim 1, wherein the quantity variable comprises one of:
   the part is mandatory for its parent, the part is optional for its parent, or multiple instances of the part can exist within its parent.

3. The computer readable medium of claim 1, further comprising classifying the part as static or dynamic, wherein when the part is classified as static the part is automatically generated when its parent part is generated.

4. The computer readable medium of claim 1, wherein the part-whole hierarchy constraint comprises selecting the part only if the quantity variable is greater than zero.

5. The computer readable medium of claim 1, wherein the part-whole hierarchy constraint comprises defining a minimum quantity value wherein the relative quantity variable is greater than or equal to the minimum quantity value.

6. The computer readable medium of claim 1, wherein the part-whole hierarchy constraint comprises defining a maximum quantity value wherein the relative quantity variable is no greater than the maximum quantity value.

7. The computer readable medium of claim 1, wherein the part-whole hierarchy constraint comprises defining a default quantity value for the relative quantity variable.

8. The computer readable medium of claim 1, wherein the part-whole hierarchy constraint comprises defining the part to be either required or optional for its parent.

9. The computer readable medium of claim 1, wherein the model corresponds to a product configuration.

10. A computer implemented method of solving a constraint satisfaction problem (CSP) model, wherein the model comprises a least one part-whole hierarchy, the method comprising:
    for at least one part of the part-whole hierarchy, assigning variables comprising selected, quantity, and relative quantity;
    automatically applying at least one part-whole hierarchy constraint to the part when a parent for the part is selected, wherein the constraint is based on the selected variable, quantity variable and relative quantity variable assigned to the part; and
    solving the model and generating a solution;
    wherein the selected variable represents whether the part is included in the solution for the CSP, the quantity variable represents a total number of instances of the part in the solution summed across all instances of the parent in the CSP, and the relative quantity variable represents a number of instances of the part per unit quantity of the parent in the CSP;
    wherein the part is a sub-problem of the solution for the CSP and comprises variables and constraints;
    wherein an automatically applied part-whole hierarchy constraint comprises a quantity of the part is equal to a quantity of its parent multiplied by its relative quantity variable, and solving the model comprises dynamically generating additional instances of the part to equal the quantity of its parent multiplied by its relative quantity variable.

11. The method of claim 10, further comprising classifying the part as static or dynamic, wherein when the part is classified as static the part is automatically generated when its parent part is generated.

12. The method of claim 10, wherein the model corresponds to a product configuration.

13. The method of claim 10, wherein the part-whole hierarchy constraint comprises defining a minimum quantity value wherein the relative quantity variable is greater than or equal to the minimum quantity value.

14. A constraint solver system comprising:
    a processor;
    a memory coupled to the processor comprising a constraint solver module; and
    a stored constraint satisfaction problem (CSP) model, wherein the model comprises a least one part-whole hierarchy;
    wherein the constraint solver module comprises functionality that, for at least one part of the part-whole hierarchy, assigns variables comprising selected, quantity, and relative quantity, automatically applies at least one part-whole hierarchy constraint to the part when a parent for the part is selected, wherein the constraint is based on the selected variable, quantity variable and relative quantity variable assigned to the part, and solves the model and generates a solution;

wherein the selected variable represents whether the part is included in the solution for the CSP, the quantity variable represents a total number of instances of the part in the solution summed across all instances of the parent in the CSP, and the relative quantity variable represents a number of instances of the part per unit quantity of the parent in the CSP;

wherein the part is a sub-problem of the solution for the CSP and comprises variables and constraints;

wherein an automatically applied part-whole hierarchy constraint comprises a quantity of the part is equal to a quantity of its parent multiplied by its relative quantity variable, and solving the model comprises dynamically generating additional instances of the part to equal the quantity of its parent multiplied by its relative quantity variable.

15. The constraint solver system of claim 14, the functionality further comprising classifying the part as static or dynamic, wherein when the part is classified as static the part is automatically generated when its parent part is generated.

16. The system of claim 14, wherein the model corresponds to a product configuration.

17. The system of claim 14, wherein the part-whole hierarchy constraint comprises defining a minimum quantity value wherein the relative quantity variable is greater than or equal to the minimum quantity value.

\* \* \* \* \*

UNITED STATES PATENT AND TRADEMARK OFFICE
CERTIFICATE OF CORRECTION

PATENT NO.        : 8,645,302 B2                                  Page 1 of 1
APPLICATION NO.   : 12/431086
DATED             : February 4, 2014
INVENTOR(S)       : Chen et al.

It is certified that error appears in the above-identified patent and that said Letters Patent is hereby corrected as shown below:

On The Title Page

On page 2, column 2, under Other Publications, line 10, before "Systems" insert -- Technical --.

Signed and Sealed this
Second Day of December, 2014

Michelle K. Lee
*Deputy Director of the United States Patent and Trademark Office*